US006173283B1

(12) United States Patent
Kasso et al.

(10) Patent No.: US 6,173,283 B1
(45) Date of Patent: *Jan. 9, 2001

(54) METHOD, APPARATUS, AND PRODUCT FOR LINKING A USER TO RECORDS OF A DATABASE

(75) Inventors: Christopher Stephen Kasso, Sunnyvale; Yvonne Yuen-Yee Tso; Donald R. Genter, both of Palo Alto, all of CA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/031,802

(22) Filed: Feb. 27, 1998

(51) Int. Cl.[7] .................................................. G06F 17/30
(52) U.S. Cl. .................................. 707/10; 707/1; 707/3; 707/6; 707/103
(58) Field of Search .......................... 707/1, 10, 3, 200, 707/6, 103, 5, 37, 506; 345/327, 348

(56) References Cited

U.S. PATENT DOCUMENTS

| 5,491,817 | * | 2/1996 | Gopal et al. ........................ 707/200 |
|---|---|---|---|
| 5,500,793 | * | 3/1996 | Deming, Jr. et al. ................ 705/37 |
| 5,619,708 | * | 4/1997 | Ho ....................................... 705/506 |
| 5,694,594 | * | 12/1997 | Chang ................................ 707/6 |
| 5,758,153 | * | 5/1998 | Atsatt et al. ........................ 707/103 |
| 5,826,270 | * | 10/1998 | Rutkowski et al. ................ 707/10 |
| 5,884,301 | * | 3/1999 | Takano ................................ 707/3 |
| 5,895,461 | * | 4/1999 | De La Huerga et al. .......... 707/1 |
| 5,903,889 | * | 5/1999 | De La Huerga et al. .......... 707/3 |
| 5,966,126 | * | 10/1999 | Szabo ................................ 345/348 |
| 5,995,958 | * | 11/1999 | Xu ...................................... 707/3 |
| 6,020,880 | * | 2/2000 | Naimpally ........................ 345/327 |
| 6,108,645 | * | 8/2000 | Eichstaedt et al. ................ 707/1 |

OTHER PUBLICATIONS

Chen et al., "Automatic construction of networks of concepts characterzing document databases", IEEE, 1992, pp. 885–902.*

Mirghafori et al., "A design for file access in a mobile environment", IEEE, 1994, pp. 57–62.*

Shih et al., "a objected–oriented database for intelligent multimedia presentations", IEEE, 1996. pp. 2904–2909.*

* cited by examiner

Primary Examiner—Wayne Amsbury
Assistant Examiner—Thuy Pardo
(74) Attorney, Agent, or Firm—Finnegan, Henderson, Farabow, Garrett & Dunner L.L.P.

(57) ABSTRACT

In accordance with the present invention a method and system for linking a user to a data record in a directory comprises the steps, performed by one or more processors, of receiving user identifying information, selecting records based on the user identifying information, displaying the selected records to the user, receiving user input identifying at least one of the data records, linking a user to the data record by associating a reference identifier to both the user and the data record, and storing the reference identifier in a location globally accessible location.

12 Claims, 4 Drawing Sheets

METHOD, APPARATUS, AND PRODUCT FOR LINKING A USER TO RECORDS OF A DATABASE

BACKGROUND OF THE INVENTION

A. Field of the Invention

Embodiments of this invention generally relate to computer systems and, more particularly, to methods and systems for linking a user to one or more records in a directory.

B. Description of the Related Art

Electronic directories are fast becoming a popular tool for managing network resources. Printed directories comprise lists of names and other identifying information that allow others to find and easily contact the listed people. Directories may contain, for example, residents of a particular geographic region (a telephone directory), members of an organization (mailing list), or employees of a company (corporate directory). Electronic directories serve the same purpose as printed directories and contain the same type of information. In addition, computer applications use electronic directories to access information about system users, such as login account names and e-mail addresses, and physical devices, such as servers, printers, and file locations.

Early electronic directories were developed for a particular application and computer system and were often incompatible with other applications and systems. As a result, each software operating system and accompanying hardware configuration typically maintained multiple directories containing overlapping information, an unfortunate consequence of the early directory systems. New protocols soon emerged that made it possible for almost any application running on virtually any computer system to obtain directory information. The X.500 directory access protocol (DAP), for example, provides standardized functionality that assists users in browsing or searching directories regardless of the type of server hosting the directory. Another example of a directory protocol is the Lightweight Directory Access Protocol (LDAP), a TCP/IP-based version of X.500 DAP.

Directory access protocols overcome the problem of incompatible host systems and access procedures, but do not guarantee that the type of information stored in the directories is standardized. For example, one directory may store the user's entire first name, for example, while another directory may not include first names at all or may contain only a first initial. In fact, directory content often varies widely depending on the needs of the host organization or application maintaining the directory. Application programs that want to access and use the information in a directory must search the database to find a particular record. Because directory content is not standard, however, programmers cannot easily program an application to search the directory based on a particular field.

NameView™, for example, is an application program in the HotJava Views™ suite of application programs that provides users with e-mail, calendaring, name directory access, and Internet browsing capabilities all written in Java™ programming language.[1] The Java programming language is an object-oriented programming language that is described, for example, in a text entitled "The Java Language Specification" by James Gosling, Bill Joy, and Guy Steele, Addison-Wesley, 1996.

[1] Sun, Sun Microsystems, the Sun Logo, NameView, HotJava Views, and Java are trademarks or registered trademarks of Sun Microsystems, Inc. in the United States and other countries.

NameView enables users to view a name directory provided by an application within HotJava Views or downloaded from an existing directory database. Typically, a host organization configures the NameView directory to contain user information such as name, telephone number, and e-mail address. Each host organization, however, may customize their NameView directory to include different information.

Programmers can design applications to contain links to information in other directories. These links typically comprise addresses, pointers, or other information that an application uses to access information in another application or data storage area. NameView, for example, can be programmed so that NameView records contain links to directory records containing a user's calendar or mail store address, allowing a NameView application to quickly locate and access a user's e-mail or calendar. Links between directories, however, must first be established. Ideally, the application would be able to recognize a user's record in a directory and automatically create the appropriate links.

One method of automatically linking a user to a record in a directory is by programming the application to search for a record containing the user's login information. User login information, however, is not always unique to a single individual. Network user "David E. Smith" using the login account name "desmith" may have left the network and, six months later, "Dawn E. Smith" is given access to the network under the same login account name. User records from David's use of the "desmith" login account name may still be archived on the system.

Furthermore, user login information that is unique to a particular subset of a network may not be unique to a directory database that stores company-wide information. As a result, application programs that link records solely by user login information may incorrectly link some users to records belonging to other users having the same login information.

Another method of linking a user to a record in a directory is to prompt the user to enter the information directly. This method, however, requires that the user know what information the application needs and enter the information without error. Information such as a mailbox or a calendar address may be complicated and difficult for the typical user to determine or remember. Furthermore, if the user enters incorrect or incomplete information, the application may not be able to find a matching record and may create a redundant record.

Therefore, a need exists for a method of linking a user to one or more records in a directory containing multiple records possessing the search term or terms, a method of linking a user to one or more records in a directory using a unique reference identifier, and a method of linking a user to one or more records in a directory using minimal human interaction.

SUMMARY OF THE INVENTION

Methods and systems consistent with the present invention link a user to a directory record by associating a unique reference identifier with both the user and the record. The method comprises steps of searching the directory for records containing user information, displaying one or more records containing user information and requesting user identification of a record that should be linked to the user. The method also associates a unique reference identifier with both the user and the record. Using a unique reference identifier guarantees that only the record acknowledged by the user is used by an application implementing the method.

In accordance with the present invention, as embodied and broadly described herein, a method for linking a user to data records comprising the steps, performed by a processor, of receiving user identifying information; selecting one or more stored records based on the user identifying information; displaying the selected records; receiving user input identifying at least one record of the selected records; and linking an unique user identifier with the identified record.

In accordance with another aspect of the present invention, as embodied and broadly described herein, a method for linking a user to data records comprising the steps, performed by one or more processors, of receiving user identifying information; determining whether a unique user identifier is present in the user identifying information; performing the following steps, if the unique user identifier is not present: selecting one or more stored records based on the user identifying information; displaying the selected records; receiving user input identifying at least one record of the selected records; and linking a unique user identifier with the identified record.

In accordance with still another aspect of the present invention, as embodied and broadly described herein, an apparatus for linking data records with a user, comprising a retrieval component configured to retrieve user identifying information from a data storage area; a selection component configured to select one or more stored records based on the user identifying information; a display component to display the selected records; an input device configured to receive user input identifying at least one record of the selected records; and a linking component configured to link a unique user identifier with the identified record.

In accordance with yet another aspect of the present invention, as embodied and broadly described herein, a computer program product comprising a computer usable medium having computable readable code embodied therein for linking a user to a data record, the computer usable medium comprising a retrieval component configured to retrieve user identifying information from a data storage area; a selection component configured to select one or more stored records based on the user identifying information; a display component to display the selected records; an input device configured to receive user input identifying at least one record of the selected records; and a linking component configured to link a unique user identifier with the identified record.

BRIEF DESCRIPTION OF THE DRAWINGS

The accompanying drawings, which are incorporated in and constitute a part of this specification and, together with the description, serve to explain the advantages and principles of the invention.

DETAILED DESCRIPTION

A. Overview

Systems and methods consistent with the present invention allow applications to use records in a directory database not provided by the application with a minimal amount of human interaction. The application gathers information about the user from properties available to the application and uses the information to search and identify records in the directory database that may be related to the application user. The application displays the records to the user and asks the user to indicate via an interface method or device which record contains information actually belonging to the user. The indicated record is tagged with a unique reference identifier that is also associated with the user. Each subsequent time that the user activates the application, the tagged record will be available to the application via the unique reference identifier.

The present invention may be implemented using hardware, software or a combination of hardware and software. Specifically, the invention may be implemented using both object-oriented programming languages, like the Java and C++ programming languages, and nonobject-oriented programming languages. The invention may be implemented using a computer system comprising a single personal computer or a network of multiple computers.

Reference will now be made in detail to exemplary embodiments of the invention which are also illustrated in the accompanying drawings. The description includes exemplary embodiments, other embodiments are possible, and changes may be made to the embodiments described without departing from the spirit and scope of the invention. Wherever possible, the same reference numbers will be used throughout the drawings to refer to the same or like parts.

B. Computer Architecture

Figure 1:
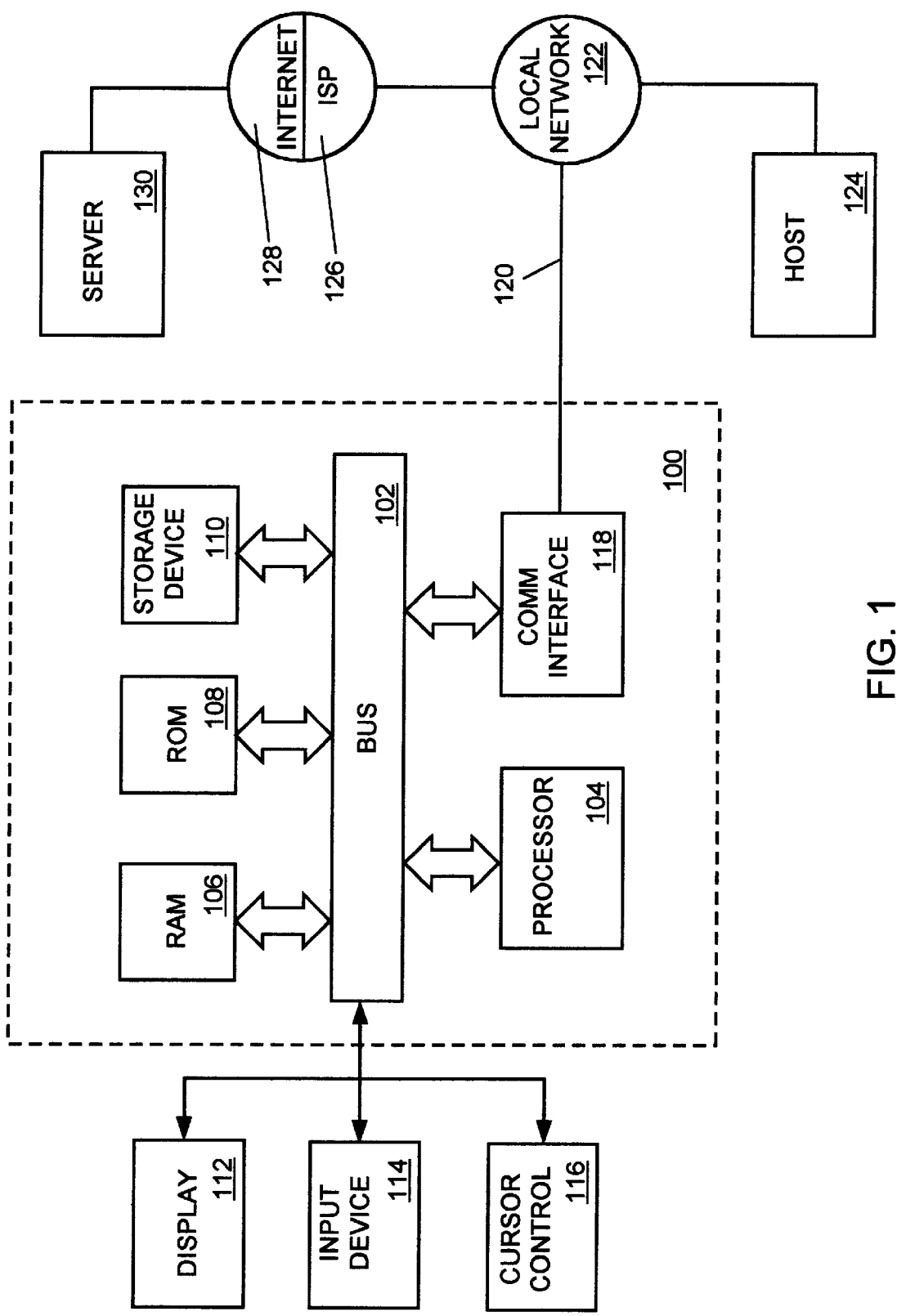
FIG. 1 is a schematic block diagram illustrating a computer architecture suitable for use with the present invention.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory, such as a random access memory (RAM) 106 or other dynamic storage device, coupled to bus 102 for storing information and instructions to be executed by processor 104. RAM 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for linking a user to records of a database. Consistent with one implementation of the invention, information from the multiple remote resources is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In an alternative implementation, hard-wired circuitry may be used in place of or in combination with software instructions to implement the invention. Thus implementations of the invention are not limited to any specific combination of hardware circuitry and software.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire, and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to local network 122. For example, communication interface 118 may be an integrated services digital network (ISDN) card or a modem to provide a data communication connection to a corresponding type of telephone line. As another example, communication interface 118 may be a local area network (LAN) card provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 and/or to data equipment operated by an Internet Service Provider (ISP) 126. ISP 126 in turn provides data communication services through the Internet 128. Local network 122 and Internet 128 both use electric, electromagnetic, or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the present invention, one such downloaded application links a user to a directory record by associating a unique reference identifier with both the user and the record, as described herein. The received code may be executed by processor 104 as it is received, and/or stored in storage device 110, or other non-volatile storage for later execution. In this manner, computer system 100 may obtain application code in the form of a carrier wave.

Although computer system 100 is shown in FIG. 1 as being connectable to one server, 130, those skilled in the art will recognize that computer system 100 may establish connections to multiple servers on Internet 128.

C. Process

Figure 2A:
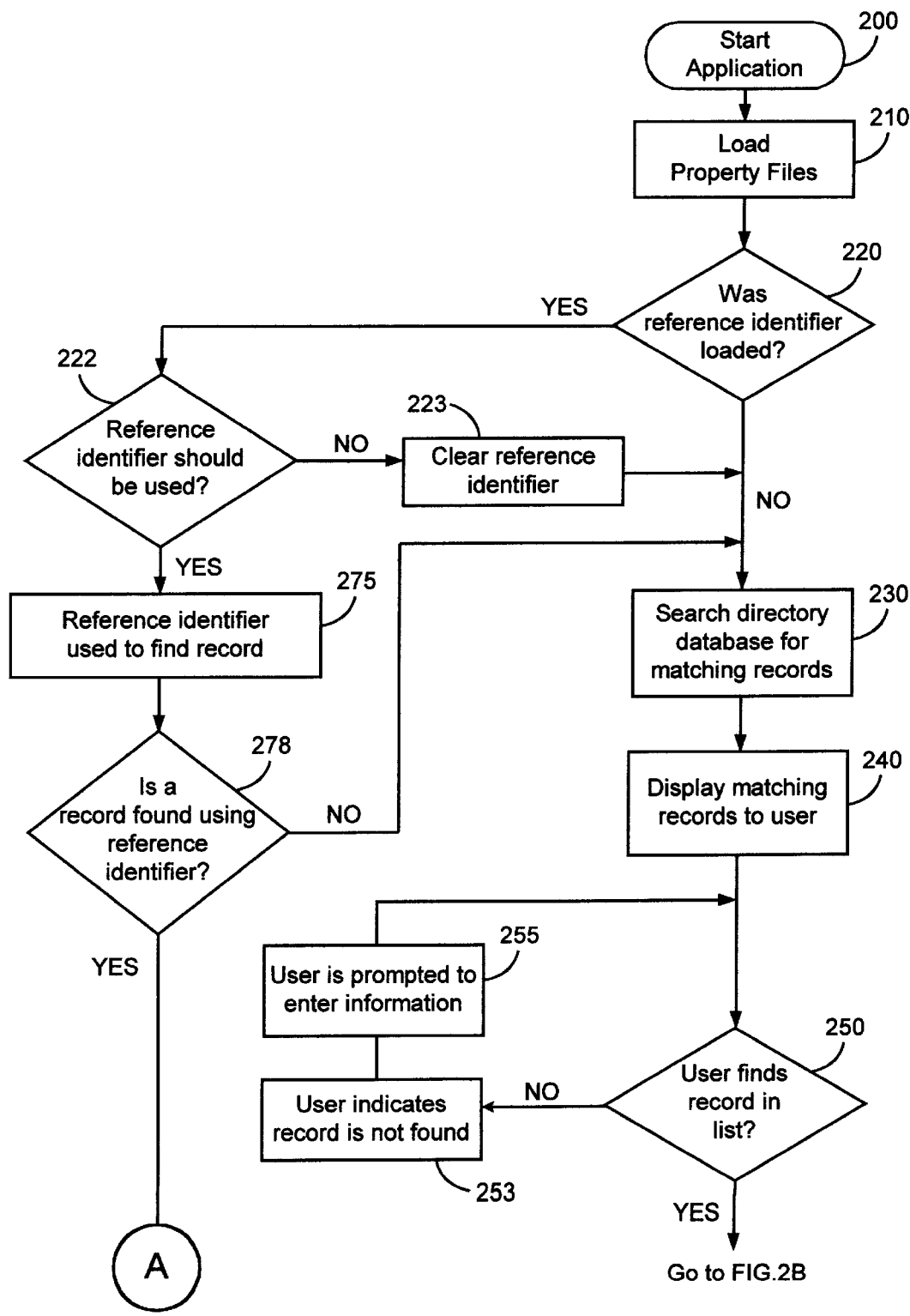
FIGS. 2A–2B is a flowchart of the steps performed by the processor consistent with the present invention.
Figure 2B:
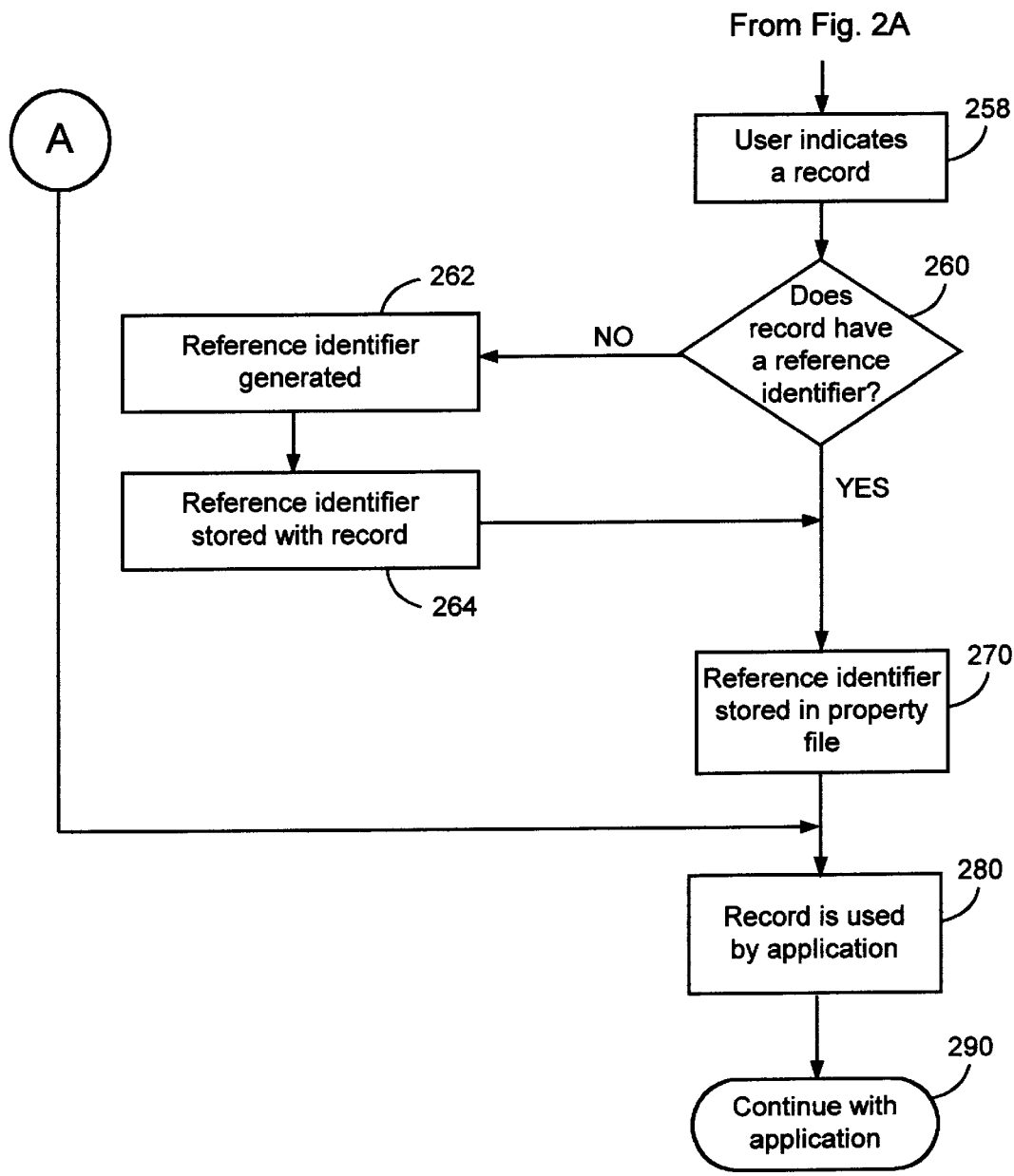

FIGS. 2A–2B include a flow chart of steps used by methods consistent with the present invention for linking a user to a record executed by an application program. The process will be described in terms of the operation of an application program.

The process begins when the application program is activated (step 200). First, the application program loads property files from one or more locations (step 210). The application program loads system properties that contain, for example, information about the runtime environment and the identity of the current user. Some system properties are provided by a system administrator; others are determined at runtime by the application. The application also loads user property files containing information specific to the current user such as application or screen preferences and the reference identifier.

After the property files are loaded, the application program checks to see if a reference identifier was among the properties loaded (step 220). A "reference identifier" is a unique value or attribute such as an employee identification number, social security number, or other property associated with the user that can be used to uniquely identify a record associated with the user. In alternate embodiments, the reference identifier may comprise multiple attributes that unambiguously identify a record in the directory. The type of reference identifier may be predetermined by the manufacturer or system administrator or determined from system properties.

If the application program finds a reference identifier, the application decides whether the reference identifier is valid or should be cleared (step 222). A user may wish, for example, to disassociate or "unlink" a record currently being used by the application that was mistakenly linked to the user. The user may, for example, notify a system administrator to alert the application to clear the reference identifier upon next activation of the application. If the reference identifier is not cleared, the process continues with step 275. The reference identifier is then used to find a record in the directory database (step 275). The location of the directory database is determined by a system administrator and defined in system properties available to the application. The directory may be stored anywhere on the network including, for example, host 124, local network 122, ISP 126, Internet 128, or server 130, as shown in FIG. 1.

If a record is found using the reference identifier (step 278), the record associated with the reference identifier subsequently is used by the application program (step 280) as shown in FIG. 2B. In HotJava Views, for example, the record may provide information used by the application to locate the user's calendar or load the user's mailbox. Referring again to FIG. 2A, if no record is found (step 278), the application then searches the directory database for matching records (step 230), and the process proceeds from step 230.

Figure 3:
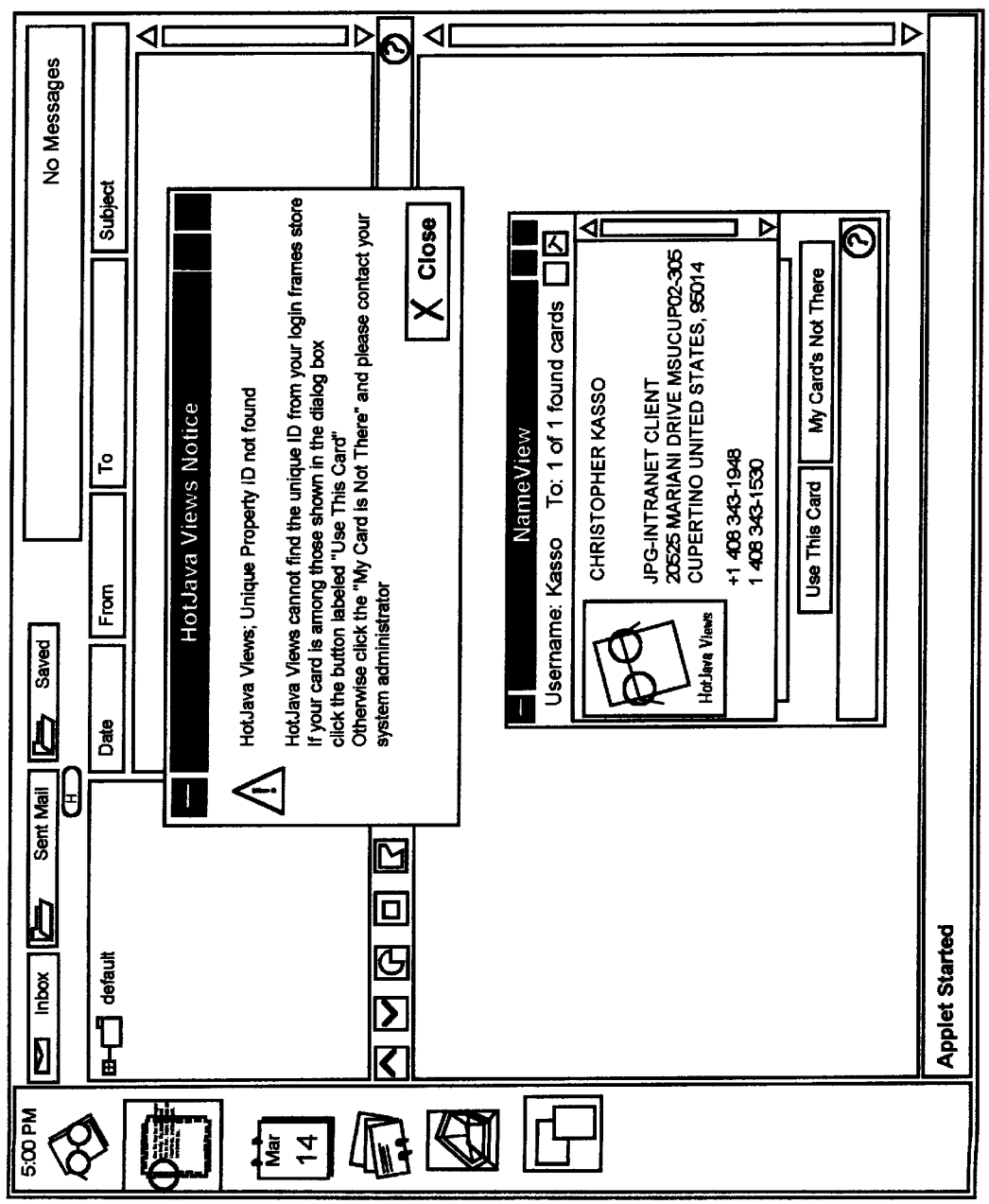
FIG. 3 is a pictorial representation of a graphic user interface for use with one embodiment of the present invention.

If the reference identifier is cleared (step 223), the process continues with step 230. Next, the application program searches the directory database for records containing attributes obtained from system properties such as user login account name, user name, language the user is using, or other information. The application program displays to the user records that match one or more attributes (step 240). FIG. 3 shows an example of a graphical user interface that may be displayed to the user when matching records are identified. If one of the matching records should be associated with the user (step 250), the user indicates the appropriate record (258). The user may indicate the record to the application by, for example, pressing the button "Use This Card" using a mouse or other user interface device as shown in FIG. 3 or other suitable means.

Referring again to FIG. 2A, if the user does not wish to associate any of the records found by the application, the user indicates a record was not found. The user may press a button indicating "My Card's Not There" as shown in FIG. 3 (step 253). If no record is chosen, the application program prompts the user to enter more information (step 255). For example, if the application is attempting to locate a record containing the user's mailbox address, the application may prompt the user to enter the mailbox address directly, if a record containing that information is not located.

If the user finds (step 250) and indicates their record in the set of matching records (step 258), the application program looks for a reference identifier associated with that record (step 260). If the record has a reference identifier, the application program retrieves the reference identifier and stores the reference identifier as a property in the user's property file (step 270). The reference identifier is stored in a well-defined location shared by multiple applications such as the user's property file. The next time the user activates any application with access to the user's property file, the reference identifier will be found and the process will proceed from step 222.

If the identified record does not have a reference identifier, the application program generates a reference identifier (step 262). The application program may generate an identifier by, for example, combining one or more of the user's social security number, employee number, or other properties already associated with the user. The application program may also generate a unique number and assign the number to a user as the need arises. Once generated, the reference identifier is then stored with the user-identified record if the user has permission to write to the record (step 264) and also is stored as a property in a property file (step 270). If the user does not have write access to the property file, the user notifies a system administrator for the directory that can update the record. To complete the process, the identified record is then used by the application (step 280) and the application continues normally (step 290).

D. Conclusion

In accordance with the present invention, an application implementing the method can link records in a directory database to a user with a minimal amount of human interaction. The application retrieves user identifying information from properties and automatically searches the directory database for records that contain the user identifying information. A unique reference identifier is associated with both the user and any records indicated by the user.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or hardware alone. The scope of the invention is defined by the claims and their equivalents.

We claim:

1. A method for operating a computer system comprising the steps of:

executing an application that performs the substeps of:
loading a user property file comprising a first set of user properties;
searching a database for any records containing the first set of user properties or a set of computer system properties associated with the user;
displaying any records located during the search;
receiving user input selecting at least one of the displayed records, the displayed record comprising a second set of user properties; and
storing in the user property file one or more user properties found in the second set of user properties not also in the first set of user properties.

2. The method of claim 1, further comprising the step of:
accessing the set of computer system properties associated with the user.

3. The method of claim 1, wherein the set of computer properties associated with the user comprises user login information.

4. The method of claim 1, wherein the step of storing in the user property file one or more user properties further comprises:

storing in the user property file one or more user properties such that in subsequent executions of the application, only one unique record will be located during the search.

5. An apparatus comprising:

a component configured to load a user property file comprising a first set of user properties;

a component configured to search a database for any records containing the first set of user properties or a set of computer system properties associated with the user;

a component configured to display any records located during the search;

a component configured to receive user input selecting at least one of the displayed records, the displayed record comprising a second set of user properties; and a component configured to store in the user property file one or more user properties found in the second set of user properties not also in the first set of user properties.

6. The apparatus of claim 5, further comprising:

a component configured to access the set of computer system properties associated with the user.

7. The apparatus of claim 5, wherein the set of computer properties associated with the user comprises user login information.

8. The apparatus of claim 5, wherein the step of storing in the user property file one or more user properties further comprises:

storing in the user property file one or more user properties such that in subsequent executions of the application, only one unique record will be located during the search.

9. A computer program product comprising:

a computer usable medium having computable readable code embodied therein for executing an application that performs a method, the method comprising the substeps of:

loading a user property file comprising a first set of user properties;

searching a database for any records containing the first set of user properties or a set of computer system properties associated with the user;

displaying any records located during the search;

receiving user input selecting at least one of the displayed records, the displayed record comprising a second set of user properties; and storing in the user property file one or more user properties found in the second set of user properties not also in the first set of user properties.

10. The computer program product of claim 9, wherein the method further comprises the step of:

accessing the set of computer system properties associated with the user.

11. The computer program product of claim 9, wherein the set of computer properties associated with the user comprises user login information.

12. The computer program product of claim 9, wherein the step of storing in the user property file one or more user properties further comprises:

storing in the user property file one or more user properties such that in subsequent executions of the application, only one unique record will be located during the search.

* * * * *

UNITED STATES PATENT AND TRADEMARK OFFICE
CERTIFICATE OF CORRECTION

PATENT NO. : 6,173,283 B1
DATED : January 9, 2001
INVENTOR(S) : Christopher Stephen Kasso, Yvonne Yuen-Yee Tso, and Donald R. Genter It is certified that error appears in the above-identified patent and that said Letters Patent is hereby corrected as shown below:

<u>Column 10, claim 11,</u>
Line 11, change "claim 9" to -- claim 10 --; and

<u>Column 10, claim 12,</u>
Line 11, change "claim 9" to -- claim 11 --.

Signed and Sealed this

Twentieth Day of November, 2001

*Attest:*

NICHOLAS P. GODICI
*Acting Director of the United States Patent and Trademark Office*

*Attesting Officer*

UNITED STATES PATENT AND TRADEMARK OFFICE
CERTIFICATE OF CORRECTION

PATENT NO. : 6,173,283 B1
DATED : January 9, 2001
INVENTOR(S) : Christopher Stephen Kasso, Yvonne Yuen-Yee Tso, and Donald R. Gentner It is certified that error appears in the above-identified patent and that said Letters Patent is hereby corrected as shown below:

Title page,
Item [75], Inventors, Christopher Stephen Kasso, Sunnyvale; Yvonne Yuen-Yee Tso, Donald L. Genter, both of Palo Alto, all of CA (US)" should read -- Inventors, Christopher Stephen Kasso, Sunnyvale; Yvonne Yuen-Yee Tso, Donald L. Gentner, both of Palo Alto, all of CA (US) --.

Signed and Sealed this

Twenty-third Day of April, 2002

*Attest:*

JAMES E. ROGAN
*Attesting Officer*  *Director of the United States Patent and Trademark Office*